(12) United States Patent
Smith et al.

(10) Patent No.: US 12,391,068 B1
(45) Date of Patent: Aug. 19, 2025

(54) AXLE ASSEMBLY WITH INTERCHANGEABLE SHAFTS

(71) Applicant: Textron Inc., Providence, RI (US)

(72) Inventors: David Alan Smith, Graniteville, SC (US); Justin Blake Williams, Warrenville, SC (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 18/743,366

(22) Filed: Jun. 14, 2024

(51) Int. Cl.
*B60B 35/14* (2006.01)
*B60B 35/16* (2006.01)

(52) U.S. Cl.
CPC .............. *B60B 35/14* (2013.01); *B60B 35/16* (2013.01)

(58) Field of Classification Search
CPC ................................ B60B 35/14; B60B 35/16
See application file for complete search history.

(56) References Cited

U.S. PATENT DOCUMENTS

| | | | |
|---|---|---|---|
| 3,933,367 A | 1/1976 | Tamas |
| 4,027,898 A | 6/1977 | Steen |
| 4,134,604 A | 1/1979 | Jackson |
| 4,141,428 A | 2/1979 | Loeb |
| 4,192,396 A | 3/1980 | Austermann et al. |
| 4,227,716 A | 10/1980 | Nordstrom |
| 4,322,061 A | 3/1982 | Masser |
| 4,331,348 A | 5/1982 | Raidel |
| 4,519,589 A | 5/1985 | Skynar |
| 4,611,793 A | 9/1986 | Nishiyama et al. |
| 4,732,371 A | 3/1988 | Pflederer |
| 4,733,744 A | 3/1988 | Glaze |
| 5,114,125 A | 5/1992 | Srch et al. |
| 5,458,360 A | 10/1995 | Raidel |
| 5,599,038 A | 2/1997 | German |
| 5,810,377 A | 9/1998 | Keeler et al. |
| 5,921,570 A | 7/1999 | Lie |
| 5,950,971 A | 9/1999 | Koumbis et al. |
| 5,971,654 A | 10/1999 | Sweeney, Jr. |
| 6,082,750 A | 7/2000 | Merkler et al. |
| 6,257,606 B1 | 7/2001 | Hynes et al. |
| 6,364,333 B1 | 4/2002 | Atkinson |
| 6,406,008 B1 | 6/2002 | Dudding et al. |
| 6,478,320 B2 | 11/2002 | Encio Martinez |
| 6,910,681 B1 | 6/2005 | Hitt et al. |
| 6,941,634 B2 | 9/2005 | Bigsby |
| 7,025,428 B2 | 4/2006 | Gabella et al. |

(Continued)

*Primary Examiner* — Faye M Fleming
(74) *Attorney, Agent, or Firm* — FOLEY & LARDNER LLP (57) ABSTRACT

A golf vehicle includes a chassis having a front end and a rear end, a suspension system coupled to the chassis, a first plurality of tractive assemblies, a second plurality of tractive assemblies, a first axle assembly coupled to the suspension system and the first plurality of tractive assemblies, and a second axle assembly. The second axle assembly is coupled to the suspension system and the second plurality of tractive assemblies, and includes a first shaft assembly and a second shaft assembly. The first shaft assembly and the second shaft assembly are interchangeable to transition the second axle assembly between (i) a first configuration that provides a first ride height for the front end or the rear end and (ii) a second configuration that provides a second ride height for the front end or the rear end that is greater than the first ride height.

20 Claims, 7 Drawing Sheets

(56) References Cited

U.S. PATENT DOCUMENTS

| | | | |
|---|---|---|---|
| 7,077,413 B2 | 7/2006 | Svartz et al. | |
| 7,290,758 B2 | 11/2007 | Svendsen et al. | |
| 7,469,913 B2 | 12/2008 | Leden et al. | |
| 7,520,517 B2 | 4/2009 | Svendsen et al. | |
| 8,356,827 B2 | 1/2013 | Takeda | |
| 8,464,611 B1 * | 6/2013 | Chandler | B60K 17/165 |
| | | | 74/607 |
| 8,540,262 B2 | 9/2013 | Reiter et al. | |
| 9,114,685 B2 | 8/2015 | Wilson et al. | |
| 9,340,084 B2 | 5/2016 | Klinger et al. | |
| 9,776,467 B1 | 10/2017 | Gaw et al. | |
| 10,589,589 B2 | 3/2020 | Buchwitz et al. | |
| 11,648,745 B2 * | 5/2023 | Peck | B21D 53/90 |
| | | | 83/465 |
| 12,066,072 B1 * | 8/2024 | Tatum | F16D 9/06 |
| 2005/0269796 A1 | 12/2005 | Sawarynski et al. | |
| 2006/0022389 A1 | 2/2006 | Svendsen et al. | |
| 2006/0244236 A1 | 11/2006 | Cortez et al. | |
| 2008/0001379 A1 | 1/2008 | Myers et al. | |
| 2008/0042393 A1 | 2/2008 | Humphreys | |
| 2009/0189364 A1 | 7/2009 | Smith | |
| 2010/0038877 A1 | 2/2010 | Cortez et al. | |
| 2011/0127753 A1 | 6/2011 | Griffin | |
| 2014/0035250 A1 | 2/2014 | Dilworth et al. | |
| 2017/0129559 A1 | 5/2017 | Slesinski et al. | |
| 2018/0264903 A1 | 9/2018 | Stuart et al. | |
| 2019/0118600 A1 | 4/2019 | Gerhards et al. | |
| 2021/0323393 A1 | 10/2021 | Kontermann et al. | |

\* cited by examiner

AXLE ASSEMBLY WITH INTERCHANGEABLE SHAFTS

BACKGROUND

Vehicles typically have a pre-set, manufactured ride height. Some consumers, however, desire to adjust the ride height to their preference. Such adjustment typically requires an aftermarket kit and complex installation processes that many consumers may not have the ability to perform themselves, leading to increased ride height adjustment costs and increased downtime of the vehicle.

SUMMARY

One embodiment relates to a golf vehicle. The golf vehicle includes a chassis having a front end and a rear end, a suspension system coupled to the chassis, a first plurality of tractive assemblies, a second plurality of tractive assemblies, a first axle assembly coupled to the suspension system and the first plurality of tractive assemblies, and a second axle assembly. The second axle assembly is coupled to the suspension system and the second plurality of tractive assemblies, and includes a first shaft assembly and a second shaft assembly. The first shaft assembly and the second shaft assembly are interchangeable to transition the second axle assembly between (i) a first configuration that provides a first ride height for the front end or the rear end of the chassis and (ii) a second configuration that provides a second ride height for the front end or the rear end of the chassis that is greater than the first ride height.

Another embodiment relates to a vehicle. The vehicle includes a chassis having a front end and a rear end, a suspension system coupled to the chassis and including a first leaf spring and a second leaf spring, a first tractive element, a second tractive element, and an axle assembly coupled to the first leaf spring, the second leaf spring, the first tractive element, and the second tractive element. The axle assembly includes a first shaft assembly, a second shaft assembly, and a differential. The first shaft assembly includes a first suspension support coupled to the first leaf spring. The second shaft assembly includes a second suspension support coupled to the second leaf spring. The differential has a first side and an opposing second side. The first shaft assembly and the second shaft assembly are selectively couplable to the first side and the opposing second side. The first shaft assembly and the second shaft assembly are coaxial about an axis of rotation of the axle assembly. The first shaft assembly and the second shaft assembly are interchangeable between the first side and the second side of the differential to transition the axle assembly between (i) a first configuration that provides a first ride height for the front end or the rear end of the chassis and (ii) a second configuration that provides a second ride height for the front end or the rear end of the chassis that is greater than the first ride height.

Still another embodiment relates to an axle assembly for a vehicle. The vehicle includes (i) a chassis having a front end and a rear end, (ii) a differential, and (iii) a suspension system. The axle assembly includes a first shaft assembly and a second shaft assembly. The first shaft assembly includes a first suspension support configured to couple to the suspension system and the differential. The second shaft assembly includes a second suspension support configured to couple to the suspension system and the differential. The first shaft assembly and the second shaft assembly are configured to selectively couple to the differential. The first shaft assembly and the second shaft assembly are interchangeable between a first side of the differential and an opposing second side of the differential to transition the axle assembly between (i) a first configuration that provides a first ride height for the front end or the rear end of the chassis and (ii) a second configuration that provides a second ride height for the front end or the rear end of the chassis that is greater than the first ride height.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, the vehicle of the present disclosure includes an axle assembly configured to facilitate varying a height (e.g., a ride height, a ground clearance, etc.) of the vehicle. The axle assembly includes a first shaft assembly and a second shaft assembly configured to couple to opposing sides of a differential. The differential is configured to allocate torque to the axles of the first shaft assembly and the second shaft assembly to provide rotational energy to tractive elements coupled thereto. The first shaft assembly includes a first suspension support configured to facilitate coupling one or more components of a suspension system of the vehicle (e.g., a leaf spring) with the first shaft assembly. Similarly, the second shaft assembly includes a second suspension support configured to facilitate coupling one or more components of the suspension system of the vehicle (e.g., a leaf spring) with the second shaft assembly. The first shaft assembly and the second shaft assembly are coaxial with each other about an axis of rotation. The first shaft assembly and the second shaft assembly are interchangeable with each other by flipping or swapping them (i) about a substantially vertical plane perpendicular to the axis of rotation and (ii) between the first side and the second side of the differential to transition the axle assembly between a first, lowered configuration and a second, raised configuration. The first shaft assembly and the second shaft assembly have a symmetric design such that the first shaft assembly and the second shaft assembly are interchangeable with each other to have the first suspension support and the second suspension support positioned on a top side of the first shaft assembly and the second shaft assembly, respectively. In this manner, the leaf spring can be mounted directly to the top side of the first shaft assembly and the second shaft assembly without the need for additional parts. In the first configuration, the axle assembly is configured to space the chassis a first distance from a ground surface by a first distance. In the second configuration, the axle assembly is configured to space the chassis a second distance from the ground surface that is greater than the first distance.

Overall Vehicle

Figure 1:
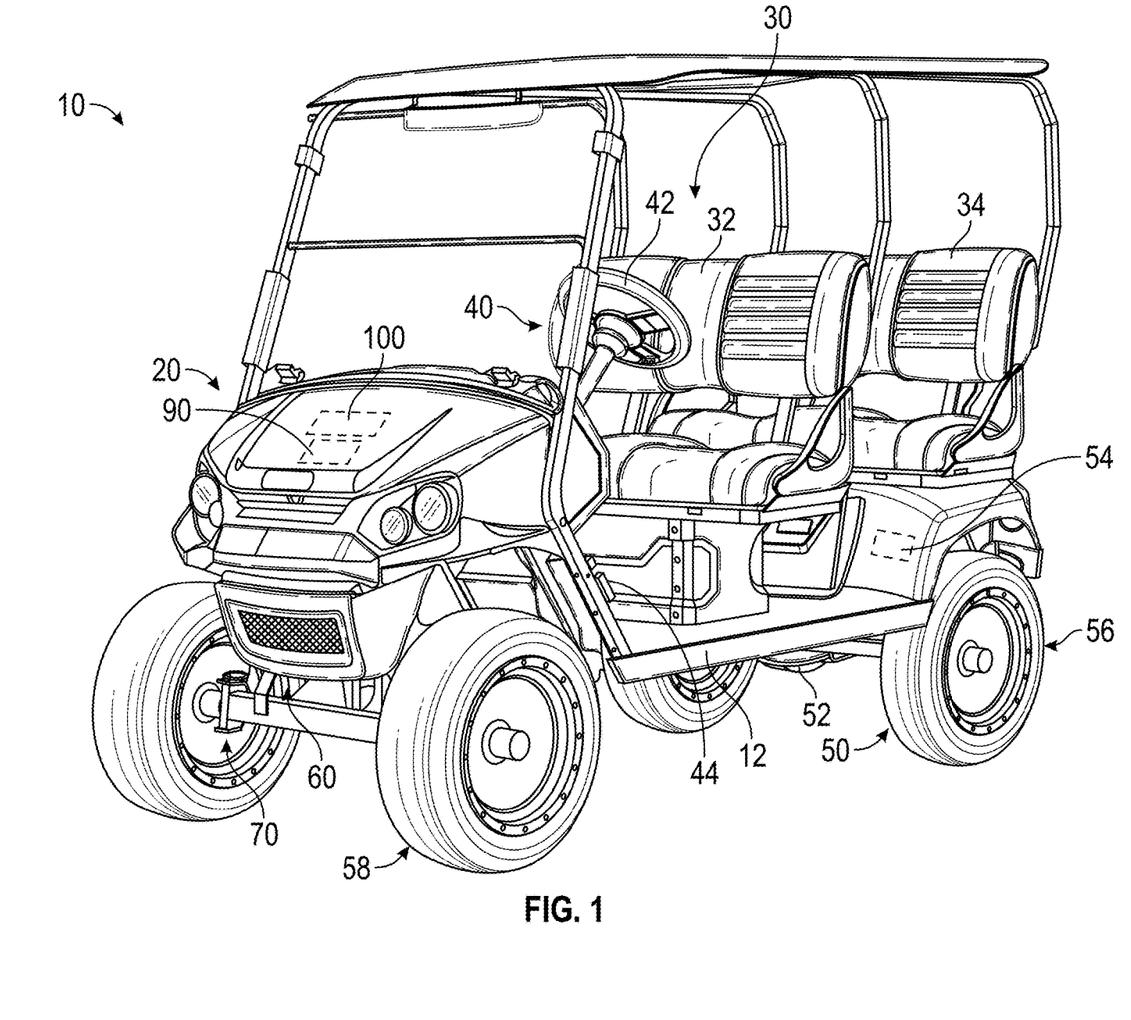
FIG. 1 is a perspective view of a vehicle, according to an exemplary embodiment.
Figure 2:
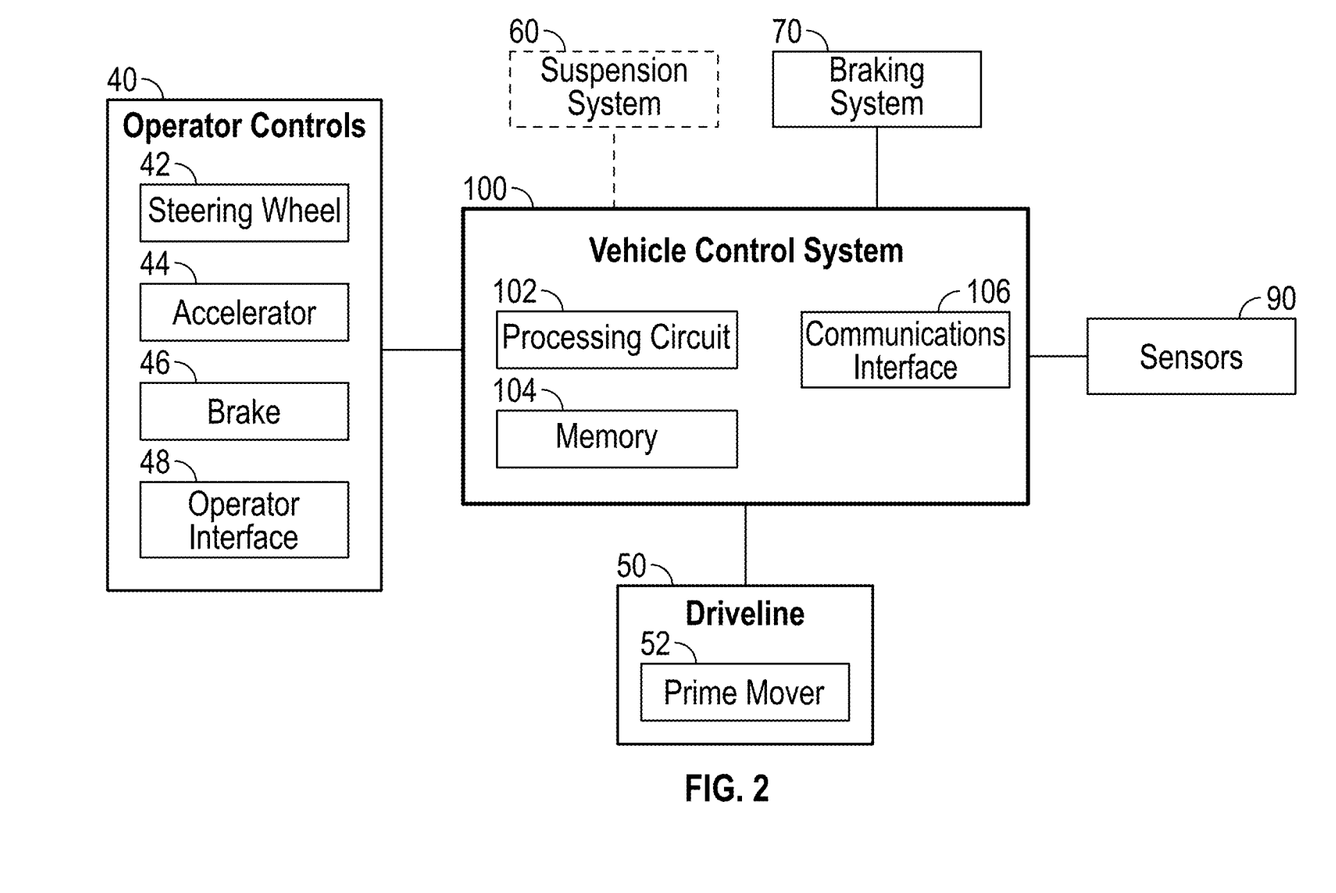
FIG. 2 is a schematic block diagram of the vehicle of FIG. 1, according to an exemplary embodiment.

As shown in FIGS. 1 and 2, a machine or vehicle, shown as vehicle 10, includes a chassis, shown as frame 12; a body assembly, shown as body 20, coupled to the frame 12 and having an occupant portion or section, shown as occupant seating area 30; operator input and output devices, shown as operator controls 40, that are disposed within the occupant seating area 30; a drivetrain, shown as driveline 50, coupled to the frame 12 and at least partially disposed under the body 20; a vehicle suspension system, shown as suspension system 60, coupled to the frame 12 and one or more components of the driveline 50; a vehicle braking system, shown as braking system 70, coupled to one or more components of the driveline 50 to facilitate selectively braking the one or more components of the driveline 50; one or more first sensors, shown as sensors 90; and a control system, shown as vehicle control system 100, coupled to the operator controls 40, the driveline 50, the suspension system 60, the braking system 70, and the sensors 90. In some embodiments, the vehicle 10 includes more or fewer components.

According to an exemplary embodiment, the vehicle 10 is an off-road machine or vehicle. In some embodiments, the off-road machine or vehicle is a lightweight or recreational machine or vehicle such as a golf cart, an all-terrain vehicle ("ATV"), a utility task vehicle ("UTV"), a low speed vehicle ("LSV"), and/or another type of lightweight or recreational machine or vehicle. In some embodiments, the off-road machine or vehicle is a chore product such as a lawnmower, a turf mower, a push mower, a ride-on mower, a stand-on mower, aerator, turf sprayers, bunker rake, and/or another type of chore product (e.g., that may be used on a golf course). In some embodiments, the vehicle 10 is an on-road vehicle such as a passenger vehicle (e.g., car, sedan, truck, etc.).

According to the exemplary embodiment shown in FIG. 1, the occupant seating area 30 includes a plurality of rows of seating including a first row of seating, shown as front row seating 32, and a second row of seating, shown as rear row seating 34. In some embodiments, the occupant seating area 30 includes a third row of seating or intermediate/middle row seating positioned between the front row seating 32 and the rear row seating 34. According to the exemplary embodiment shown in FIG. 1, the rear row seating 34 is facing forward. In some embodiments, the rear row seating 34 is facing rearward. In some embodiments, the occupant seating area 30 does not include the rear row seating 34. In some embodiments, in addition to or in place of the rear row seating 34, the vehicle 10 includes one or more rear accessories. Such rear accessories may include a golf bag rack, a bed, a cargo body (e.g., for a drink cart), and/or other rear accessories.

According to an exemplary embodiment, the operator controls 40 are configured to provide an operator with the ability to control one or more functions of and/or provide commands to the vehicle 10 and the components thereof (e.g., turn on, turn off, drive, turn, brake, engage various operating modes, raise/lower an implement, etc.). As shown in FIGS. 1 and 2, the operator controls 40 include a steering interface (e.g., a steering wheel, joystick(s), etc.), shown steering wheel 42, an accelerator interface (e.g., a pedal, a throttle, etc.), shown as accelerator 44, a braking interface (e.g., a pedal), shown as brake 46, and one or more additional interfaces, shown as operator interface 48. The operator interface 48 may include one or more displays and one or more input devices. The one or more displays may be or include a touchscreen, a LCD display, a LED display, a speedometer, gauges, warning lights, etc. The one or more input device may be or include buttons, switches, knobs, levers, dials, etc.

According to an exemplary embodiment, the driveline 50 is configured to propel the vehicle 10. As shown in FIGS. 1 and 2, the driveline 50 includes a primary driver, shown as prime mover 52, an energy storage device, shown as energy storage 54, a first tractive assembly (e.g., axles, wheels, tracks, differentials, etc.), shown as rear tractive assembly 56, and a second tractive assembly (e.g., axles, wheels, tracks, differentials, etc.), shown as front tractive assembly 58. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system. According to the exemplary embodiment shown in FIG. 1, the rear tractive assembly 56 includes rear tractive elements and the front tractive assembly 58 includes front tractive elements that are configured as wheels. In some embodiments, the rear tractive elements and/or the front tractive elements are configured as tracks.

According to an exemplary embodiment, the prime mover 52 is configured to provide power to drive the rear tractive assembly 56 and/or the front tractive assembly 58 (e.g., to provide front-wheel drive, rear-wheel drive, four-wheel drive, and/or all-wheel drive operations). In some embodiments, the driveline 50 includes a transmission device (e.g., a gearbox, a continuous variable transmission ("CVT"), etc.) positioned between (i) the prime mover 52 and (ii) the rear tractive assembly 56 and/or the front tractive assembly 58.

The rear tractive assembly 56 and/or the front tractive assembly 58 may include a drive shaft, a differential, and/or an axle. In some embodiments, the rear tractive assembly 56 and/or the front tractive assembly 58 include two axles or a tandem axle arrangement. In some embodiments, the rear tractive assembly 56 and/or the front tractive assembly 58 are steerable (e.g., using the steering wheel 42). In some embodiments, both the rear tractive assembly 56 and the front tractive assembly 58 are fixed and not steerable (e.g., employ skid steer operations).

In some embodiments, the driveline 50 includes a plurality of prime movers 52. By way of example, the driveline 50 may include a first prime mover 52 that drives the rear tractive assembly 56 and a second prime mover 52 that drives the front tractive assembly 58. By way of another example, the driveline 50 may include a first prime mover 52 that drives a first one of the front tractive elements, a second prime mover 52 that drives a second one of the front tractive elements, a third prime mover 52 that drives a first one of the rear tractive elements, and/or a fourth prime mover 52 that drives a second one of the rear tractive elements. By way of still another example, the driveline 50 may include a first prime mover 52 that drives the front tractive assembly 58, a second prime mover 52 that drives a first one of the rear tractive elements, and a third prime mover 52 that drives a second one of the rear tractive elements. By way of yet another example, the driveline 50 may include a first prime mover 52 that drives the rear tractive assembly 56, a second prime mover 52 that drives a first one of the front tractive elements, and a third prime mover 52 that drives a second one of the front tractive elements.

According to an exemplary embodiment, the suspension system 60 includes one or more suspension components (e.g., shocks, dampers, springs, etc.) positioned between the frame 12 and one or more components (e.g., tractive elements, axles, etc.) of the rear tractive assembly 56 and/or the front tractive assembly 58. In some embodiments, the vehicle 10 does not include the suspension system 60.

According to an exemplary embodiment, the braking system 70 includes one or more braking components (e.g., disc brakes, drum brakes, in-board brakes, axle brakes, etc.) positioned to facilitate selectively braking one or more components of the driveline 50. In some embodiments, the one or more braking components include (i) one or more front braking components positioned to facilitate braking one or more components of the front tractive assembly 58 (e.g., the front axle, the front tractive elements, etc.) and (ii) one or more rear braking components positioned to facilitate braking one or more components of the rear tractive assembly 56 (e.g., the rear axle, the rear tractive elements, etc.). In some embodiments, the one or more braking components include only the one or more front braking components. In some embodiments, the one or more braking components include only the one or more rear braking components. In some embodiments, the one or more front braking components include two front braking components, one positioned to facilitate braking each of the front tractive elements. In some embodiments, the one or more rear braking components include two rear braking components, one positioned to facilitate braking each of the rear tractive elements.

The sensors 90 may include various sensors positioned about the vehicle 10 to acquire vehicle information or vehicle data regarding operation of the vehicle 10 and/or the location thereof. By way of example, the sensors 90 may include an accelerometer, a gyroscope, a compass, a position sensor (e.g., a GPS sensor, etc.), an inertial measurement unit ("IMU"), suspension sensor(s), wheel sensors, an audio sensor or microphone, a camera, an optical sensor, a proximity detection sensor, and/or other sensors to facilitate acquiring vehicle information or vehicle data regarding operation of the vehicle 10 and/or the location thereof. According to an exemplary embodiment, one or more of the sensors 90 are configured to facilitate detecting and obtaining vehicle telemetry data including position of the vehicle 10, whether the vehicle 10 is moving, travel direction of the vehicle 10, slope of the vehicle 10, speed of the vehicle 10, vibrations experienced by the vehicle 10, sounds proximate the vehicle 10, suspension travel of components of the suspension system 60, and/or other vehicle telemetry data.

The vehicle control system 100 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 2, the vehicle control system 100 includes a processing circuit 102, a memory 104, and a communications interface 106. The processing circuit 102 may include an ASIC, one or more FPGAs, a DSP, circuits containing one or more processing components, circuitry for supporting a microprocessor, a group of processing components, or other suitable electronic processing components. In some embodiments, the processing circuit 102 is configured to execute computer code stored in the memory 104 to facilitate the activities described herein. The memory 104 may be any volatile or non-volatile or non-transitory computer-readable storage medium capable of storing data or computer code relating to the activities described herein. According to an exemplary embodiment, the memory 104 includes computer code modules (e.g., executable code, object code, source code, script code, machine code, etc.) configured for execution by the processing circuit 102. In some embodiments, the vehicle control system 100 may represent a collection of processing devices. In such cases, the processing circuit 102 represents the collective processors of the devices, and the memory 104 represents the collective storage devices of the devices.

In one embodiment, the vehicle control system 100 is configured to selectively engage, selectively disengage, control, or otherwise communicate with components of the vehicle 10 (e.g., via the communications interface 106, a controller area network ("CAN") bus, etc.). According to an exemplary embodiment, the vehicle control system 100 is coupled to (e.g., communicably coupled to) components of the operator controls 40 (e.g., the steering wheel 42, the accelerator 44, the brake 46, the operator interface 48, etc.), components of the driveline 50 (e.g., the prime mover 52), components of the braking system 70, and the sensors 90. By way of example, the vehicle control system 100 may send and receive signals (e.g., control signals, location signals, etc.) with the components of the operator controls 40, the components of the driveline 50, the components of the braking system 70, the sensors 90, and/or remote systems or devices (via the communications interface 106 as described in greater detail herein).

Axle Assemble with Interchangeable Shafts

As shown in FIGS. 3-8, the driveline 50 includes an axle system (e.g., a split-axle assembly), shown as axle assembly 300, including a first half-shaft assembly, shown as first shaft assembly 304, a second half-shaft assembly, shown as second shaft assembly 308, and a torque allocator, shown as differential 312, coupled to and between the first shaft assembly 304 and the second shaft assembly 308. In some embodiments, the axle assembly 300 is included as part of the rear tractive assembly 56 and/or the front tractive assembly 58. In some embodiments, the axle assembly 300 does not include the differential 312. In such embodiments, the differential 312 may be replaced with the prime mover 52 and/or a transaxle, or the axle assembly 300 may include a single solid axle (e.g., a non-driven axle, a solid front axle for the front tractive assembly 58 and a split-shaft rear axle for the rear tractive assembly 56, etc.). According to an exemplary embodiment, a free end of each of the first shaft assembly 304 and the second shaft assembly 308 opposite the differential 312 is coupled to a shaft-end assembly including a brake (e.g., one or more components of the braking system 70), one or more suspension components (e.g., of the suspension system 60, the leaf spring 390, etc.), one or more steering components, a wheel hub, a tractive element, a tire, and/or other features.

The differential 312 is configured to be coupled to one or more components of the driveline 50 of the vehicle 10 (e.g., a driveshaft of the driveline 50, the prime mover 52, a transmission of the driveline 50, etc.). The differential 312 is configured to receive rotational energy from the prime mover 52 (e.g., via the driveshaft, via the transmission, directly, etc.). As shown in FIGS. 3-6, the differential 312 is coupled to the first shaft assembly 304 and the second shaft assembly 308 to allocate torque provided by the prime mover 52 between the first shaft assembly 304 and the second shaft assembly 308 of the axle assembly 300. The first shaft assembly 304 and the second shaft assembly 308 are configured to deliver the rotational energy to tractive elements coupled thereto. According to the exemplary embodiment shown in FIGS. 3-6, the axle assembly 300 is configured as a split-axle assembly where the first shaft assembly 304 and the second shaft assembly 308 independently deliver the rotational energy to the respective tractive elements coupled thereto. In embodiments where the axle assembly 300 does not include the differential 312, the first shaft assembly 304 and the second shaft assembly 308 may be selectively coupled directly to each other (e.g., to rotate simultaneously) or coupled to each other by a component other than the differential 312.

As shown in FIGS. 3-8, each of the first shaft assembly 304 and the second shaft assembly 308 include an outer shaft (e.g., an axle housing), shown as tube 316, and an inner shaft, shown as axle 320. The axle 320 is configured to be received, at least partially, within an interior volume defined by the tube 316. The axle 320 may be rotatably coupled to the tube 316 (e.g., using one or more bearings) such that the axle 320 rotates within the tube 316 about an axis of rotation, shown as axis A. As shown in FIGS. 3-6, the tube 316 and the axle 320 are coaxial with each other about the axis A and the first shaft assembly 304 and the second shaft assembly 308 are coaxial with each other about the axis A. According to an exemplary embodiment, the axle 320 is coupled to the differential 312 and configured to receive rotational energy from the prime mover 52. In some embodiments (e.g., embodiments that do not include the differential 312), the axle 320 is coupled to a transaxle and/or the prime mover 52. As shown in FIGS. 3-6, a portion of the axle 320 extends outside of the tube 316. The portion of the axle 320 extending outside of the tube 316 is configured to couple to a tractive element to provide the rotational energy thereto.

Figure 3:
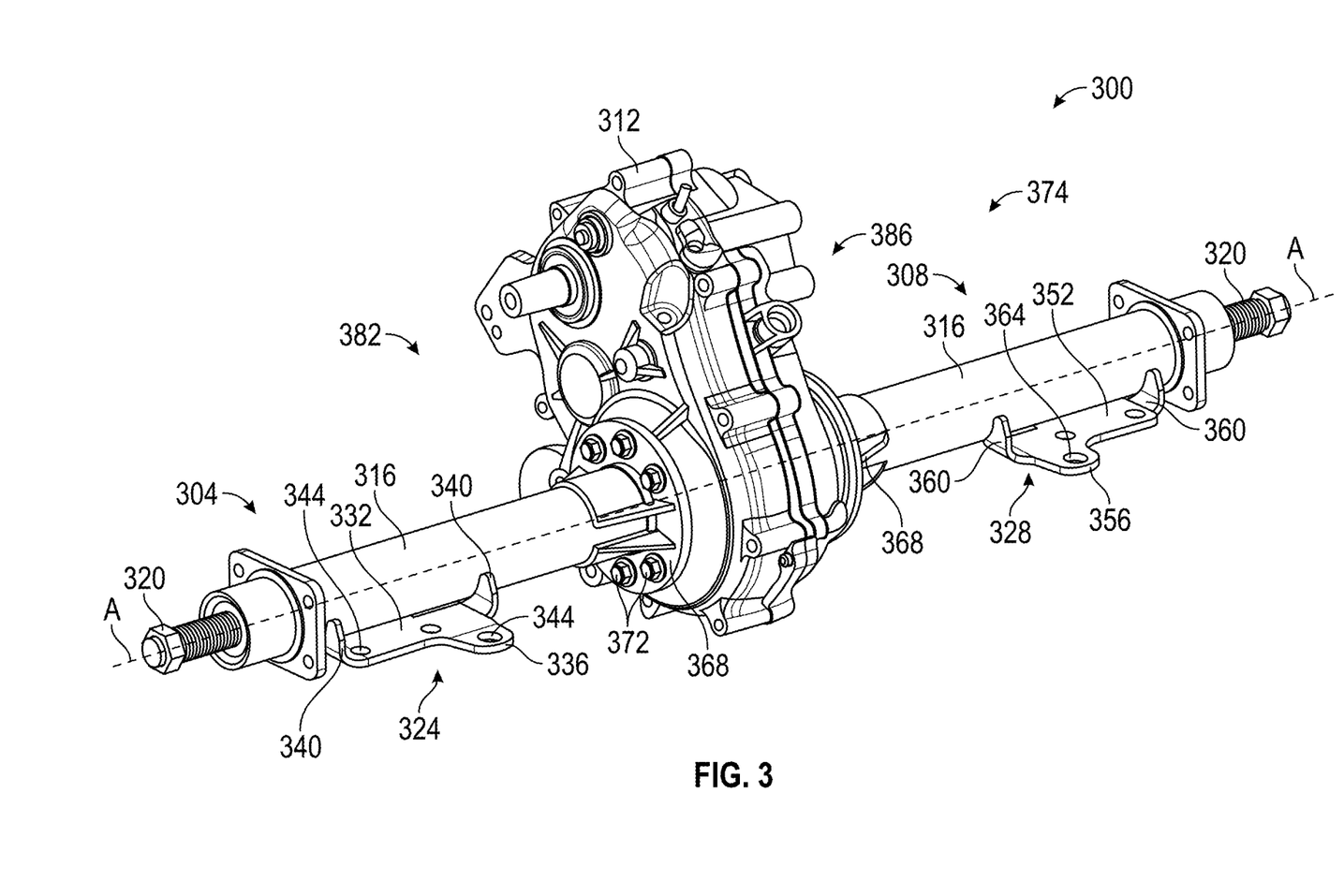
FIG. 3 is a perspective view of an axle assembly in a lowered configuration, according to an exemplary embodiment.
Figure 4:
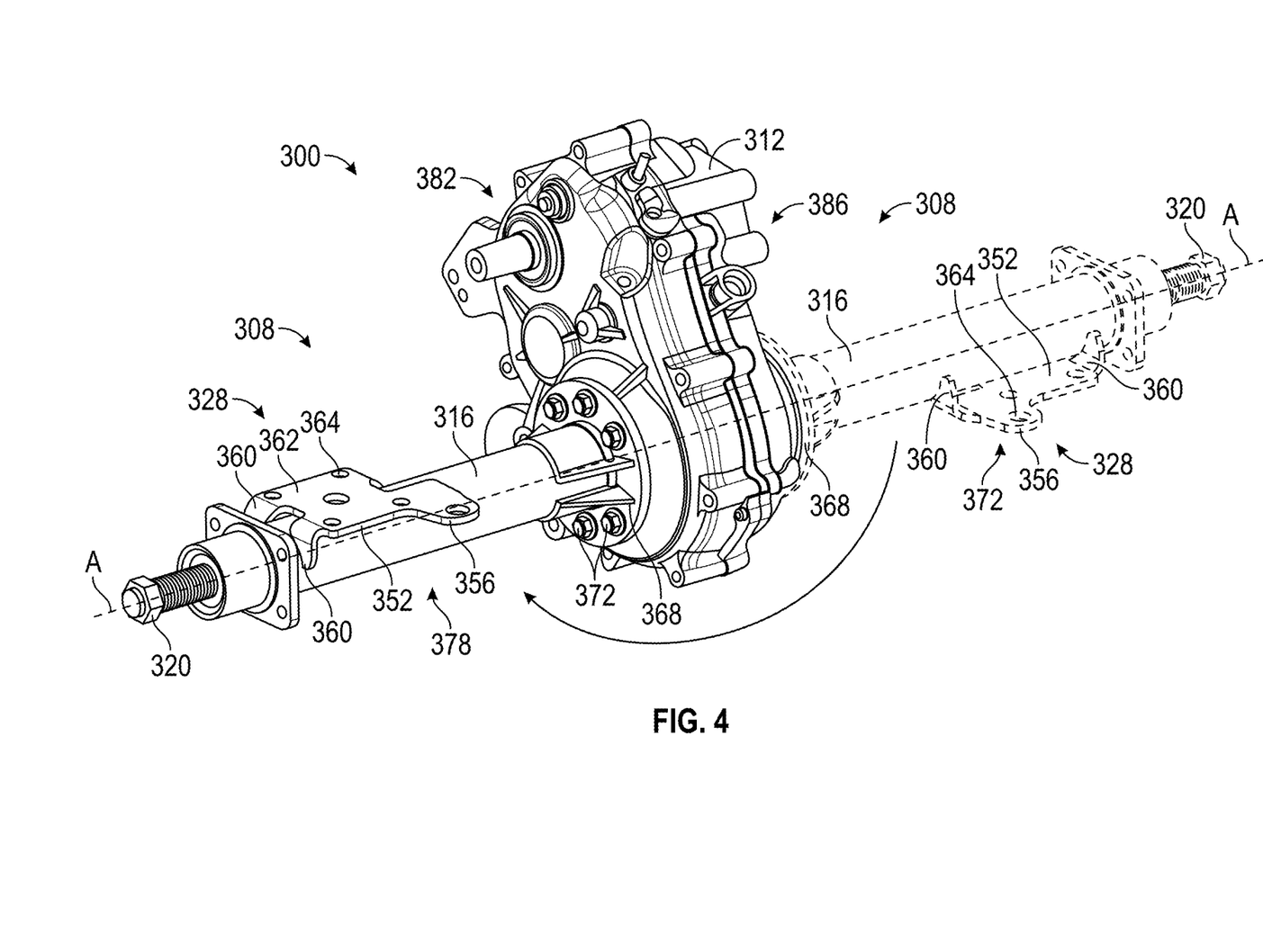
FIG. 4 is a perspective view of the axle assembly of FIG. 3 with a shaft assembly in the lowered configuration and in a raised configuration, according to an exemplary embodiment.
Figure 5:
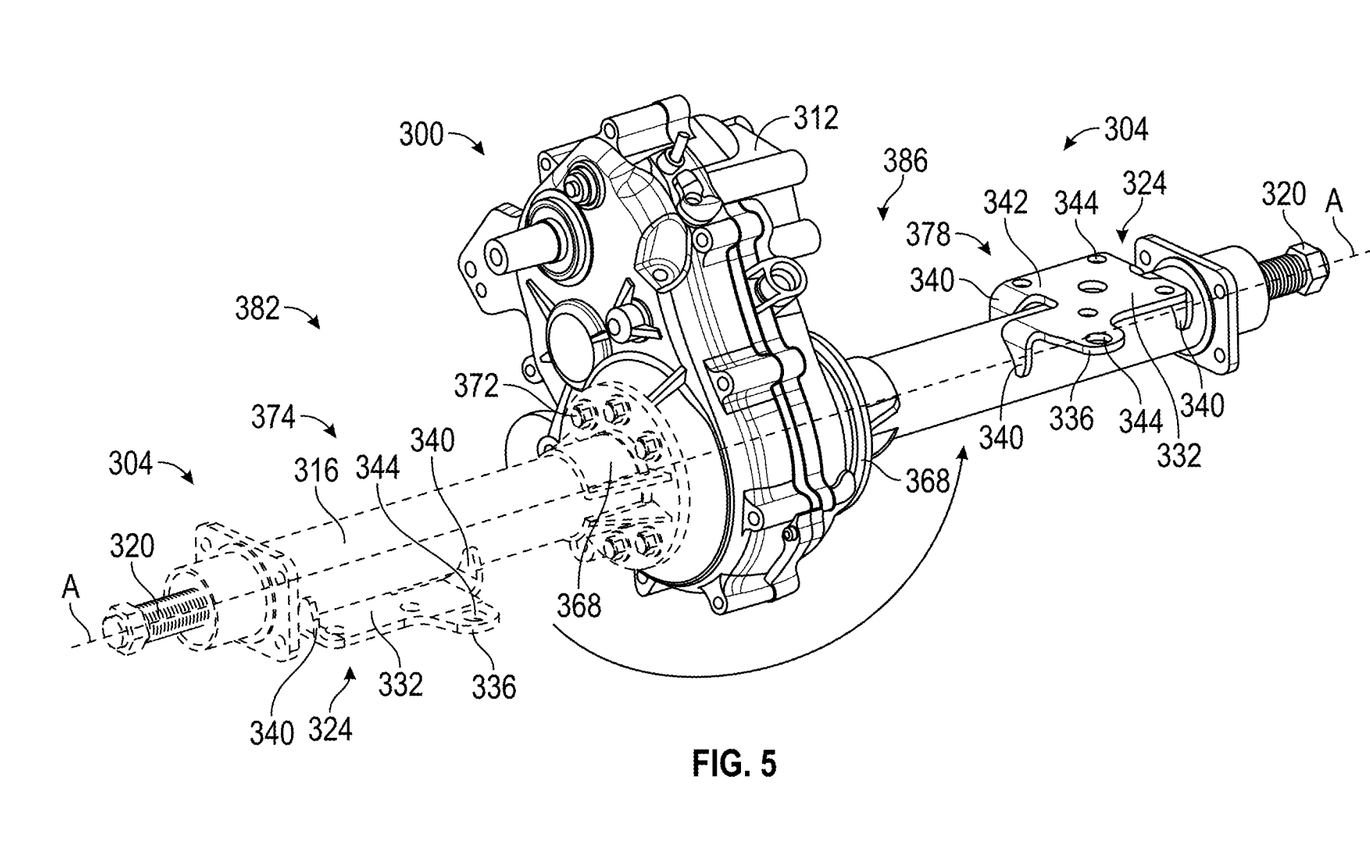
FIG. 5 is a perspective view of the axle assembly of FIG. 3 with a shaft assembly in the lowered configuration and in a raised configuration, according to an exemplary embodiment.
Figure 6:
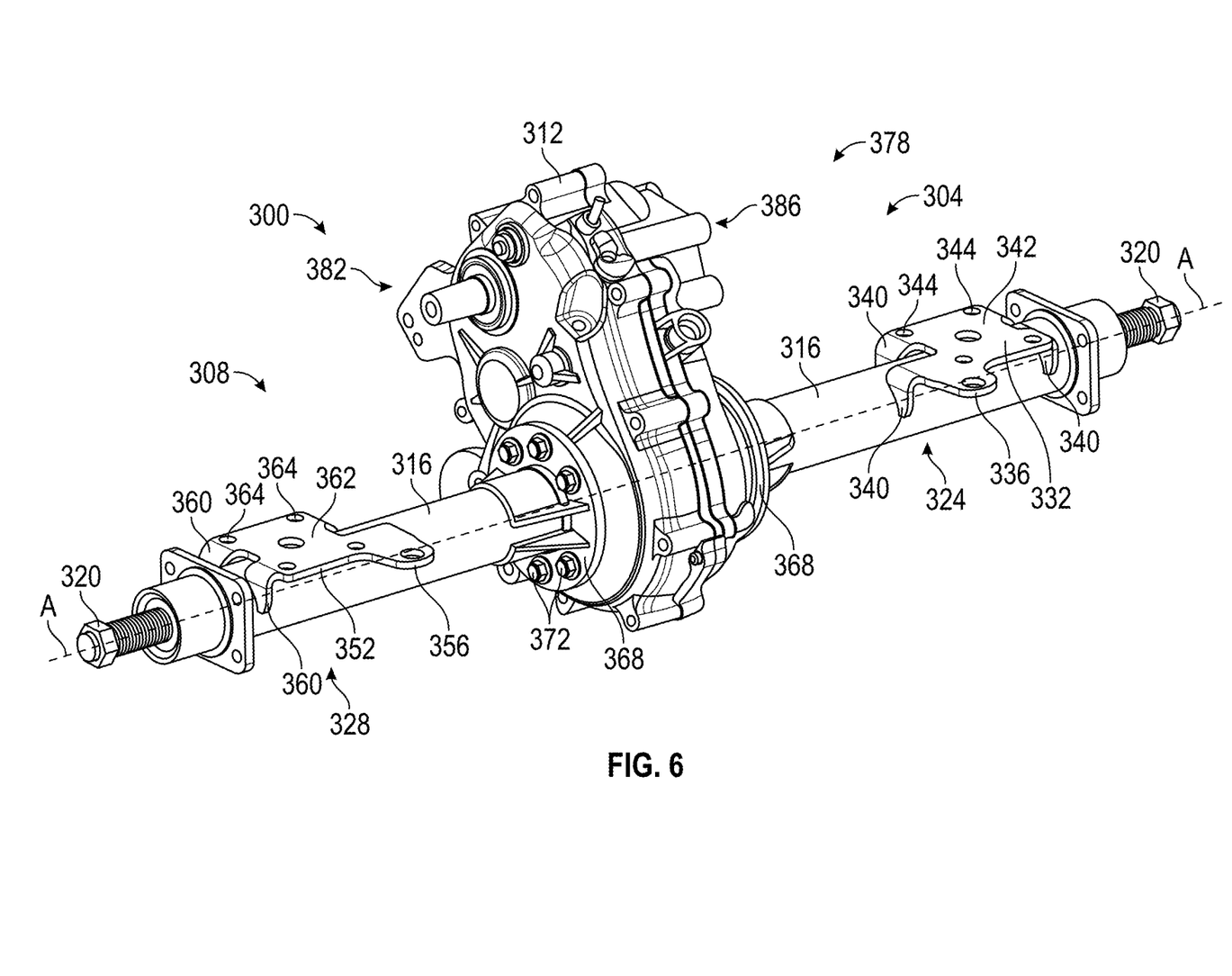
FIG. 6 is a perspective view of the axle assembly of FIG. 3 in a raised configuration, according to an exemplary embodiment.

As shown in FIGS. 3-8, the first shaft assembly 304 includes a first interface (e.g., a plate, a bracket, etc.), shown as first suspension support 324, and the second shaft assembly 308 includes a second interface (e.g., a plate, a bracket, etc.), shown as second suspension support 328. As shown in FIGS. 3, 5, and 6, the first suspension support 324 includes a first mount, shown as first mounting plate 332, a first protrusion, shown as first extension 336, extending from the first mounting plate 332, and a first plurality of engagement features, shown as first tabs 340, extending in a direction away from the first mounting plate 332 and the first extension 336 (e.g., substantially perpendicular thereto). The first mounting plate 332 extends within a substantially horizontal plane (e.g., a plane substantially parallel to a plane in which the axis A extends) and defines a generally rectangular shape. In some embodiments, the first mounting plate 332 defines another suitable shape (e.g., ovular, circular, hexagonal, etc.). As shown in FIGS. 3, 5, 6, and 8, the first extension 336 is integrally formed with the first mounting plate 332 and extends from the first mounting plate 332 within the substantially horizontal plane defined thereby (e.g., such that the first extension 336 and the first mounting plate 332 are coplanar). The first mounting plate 332 and the first extension 336 collectively define a first support surface (e.g., suspension perch, an outer face, etc.), shown as first surface 342. As shown in FIGS. 3, 5, and 6, the first extension 336 extends (i) in an inward direction (e.g., in a direction along the axis A towards the differential 312) and (ii) in a direction perpendicular to the axis A within the substantially horizontal plane. As shown in FIGS. 3, 5, and 6, the first mounting plate 332 and the first extension 336 define a plurality of apertures, shown as apertures 344, extending therethrough. In some embodiments, the apertures 344 are configured to receive fasteners (e.g., bolts, screws, nails, rivets, etc.) to facilitate coupling one or more components of the vehicle 10 (e.g., a component of the suspension system 60) to the first mounting plate 332 and the first extension 336.

As shown in FIGS. 3, 5, 6, and 8, the first tabs 340 extend in a direction away from (e.g., substantially perpendicular to) the first mounting plate 332 and the first extension 336. The first tabs 340 extend from peripheral edges of the first mounting plate 332 and the first extension 336. The first tabs 340 are configured to facilitate coupling the first suspension support 324 (e.g., the first mounting plate 332 and the first extension 336) to the tube 316 of the first shaft assembly 304. In some embodiments, the first tabs 340 are shaped (e.g., angled, curved, etc.) to support and/or accommodate the shape of the tube 316 (e.g., to facilitate coupling the first suspension support 324 therewith). In such embodiments, the shape of the first tabs 340 substantially corresponds with or matches a curvature of an outer circumference of the tube 316. In some embodiments, the first tabs 340 are welded to the tube 316 to fixedly couple the first suspension support 324 therewith. In other embodiments, the first tabs 340 are otherwise suitably engaged with the tube 316 (e.g., clamped on, adhered to, bolted to, etc.) to couple the first suspension support 324 therewith. In some embodiments, the first suspension support 324 is otherwise coupled to the tube 316 without the use of the first tabs 340. In yet other embodiments, the first suspension support 324 is integrally formed with the tube 316 (e.g., manufactured as a single unitary body).

As shown in FIGS. 4 and 5, the arrangement of the second suspension support 328 (e.g., the components included therein, the shape, etc.) is substantially similar to that of the first suspension support 324. By way of example, the arrangement of the second suspension support 328 may be a mirror image of the first suspension support 324 about a plane (e.g., a substantially horizontal plane) in which the axis A extends (see, e.g., the second suspension support 328 on the left and right sides of the differential 312 in FIG. 4 as a mirror image of the first suspension support 324 on the left and right sides of the differential 312 in FIG. 5). By way of another example, the arrangement of the second suspension support 328 may be a mirror image of the first suspension support 324 about a substantially vertical plane perpendicular to the axis A (see, e.g., the first suspension support 324 on the left side and the second suspension support 328 on the right side of the differential 312 in FIG. 3 are mirror images of each other, and the first suspension support 324 on the right side and the second suspension support 328 on the left side of the differential 312 in FIG. 6 are mirror images of each other). In a similar manner, the first shaft assembly 304 can be considered a mirror image of the second shaft assembly 308 about a substantially vertical plane perpendicular to the axis A.

As shown in FIGS. 3, 4, 6, and 7, the second suspension support 328 includes a second mount, shown as second mounting plate 352, a second protrusion, shown as second extension 356, extending from the second mounting plate 352, and a second plurality of engagement features, shown as second tabs 360, extending in a direction away from the second mounting plate 352 and the second extension 356 (e.g., substantially perpendicular thereto). The second mounting plate 352 extends within a substantially horizontal plane (e.g., a plane substantially parallel to a plane in which the axis A extends) and defines a generally rectangular shape. In some embodiments, the second mounting plate 352 defines another suitable shape (e.g., ovular, circular, hexagonal, etc.). As shown in FIGS. 3, 4, 6, and 7, the second extension 356 is integrally formed with the second mounting plate 352 and extends from the second mounting plate 352 within the substantially horizontal plane defined thereby (e.g., such that the second extension 356 and the second mounting plate 352 are coplanar). The second mounting plate 352 and the second extension 356 collectively define a second support surface (e.g., suspension perch, an outer face, etc.), shown as second surface 362. As shown in FIGS. 3, 4, and 6, the second extension 356 extends (i) in an inward direction (e.g., in a direction along the axis A towards the differential 312) and (ii) in a direction perpendicular to the axis A within the substantially horizontal plane. As shown in FIGS. 3, 4, and 6, the second mounting plate 352 and the second extension 356 define a plurality of apertures, shown as apertures 364, extending therethrough. In some embodiments, the apertures 364 are configured to receive fasteners (e.g., bolts, screws, nails, rivets, etc.) to facilitate coupling one or more components of the vehicle 10 (e.g., a component of the suspension system 60) to the second mounting plate 352 and the second extension 356. The second tabs 360 are substantially similar to the first tabs 340 and are configured to facilitate coupling the second suspension support 328 to the tube 316 of the second shaft assembly 308.

As shown in FIGS. 3-6, each of the first shaft assembly 304 and the second shaft assembly 308 includes a coupling mechanism, shown as coupler 368, configured to facilitate selectively coupling the first shaft assembly 304 and the second shaft assembly 308 to the differential 312. The coupler 368 is coupled to an outer circumference of the tube 316 proximate an end of the tube 316 configured to be positioned closest to the differential 312. In some embodiments, the coupler 368 is welded to the tube 316 to fixedly couple the coupler 368 therewith. In other embodiments, the coupler 368 is otherwise suitably engaged with the tube 316 (e.g., clamped on, adhered to, bolted to, resistance fit, etc.) to facilitate coupling the first shaft assembly 304 and the second shaft assembly 308 to the differential 312. As shown in FIGS. 3-6, the couplers 368 define a plurality of apertures positioned about a circumference thereof that are configured to receive a plurality of fasteners, shown as fasteners 372, to couple the couplers 368 (and, thereby, the first shaft assembly 304 and the second shaft assembly 308) to attachment interfaces positioned on opposing sides of the differential 312. In this manner, the first shaft assembly 304 and the second shaft assembly 308 are selectively removably coupled to the differential 312. In some embodiments, the first shaft assembly 304 and the second shaft assembly 308 are selectively removably coupled to the differential 312 in another way (e.g., without the use of the coupler 368). When the first shaft assembly 304 and the second shaft assembly 308 are coupled to the differential 312, the differential 312 is configured to allocate torque to the axles 320 to provide rotational energy to the tractive elements coupled thereto.

Figure 7:
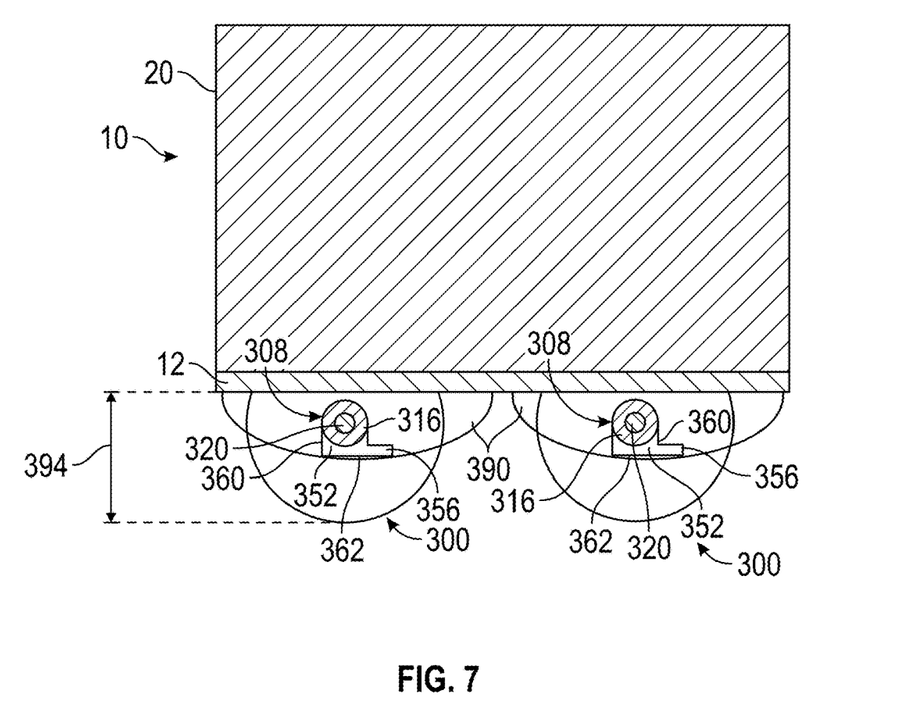
FIG. 7 is a side view of the axle assembly of FIG. 3 in the lowered configuration and coupled to the vehicle of FIG. 1, according to an exemplary embodiment.
Figure 8:
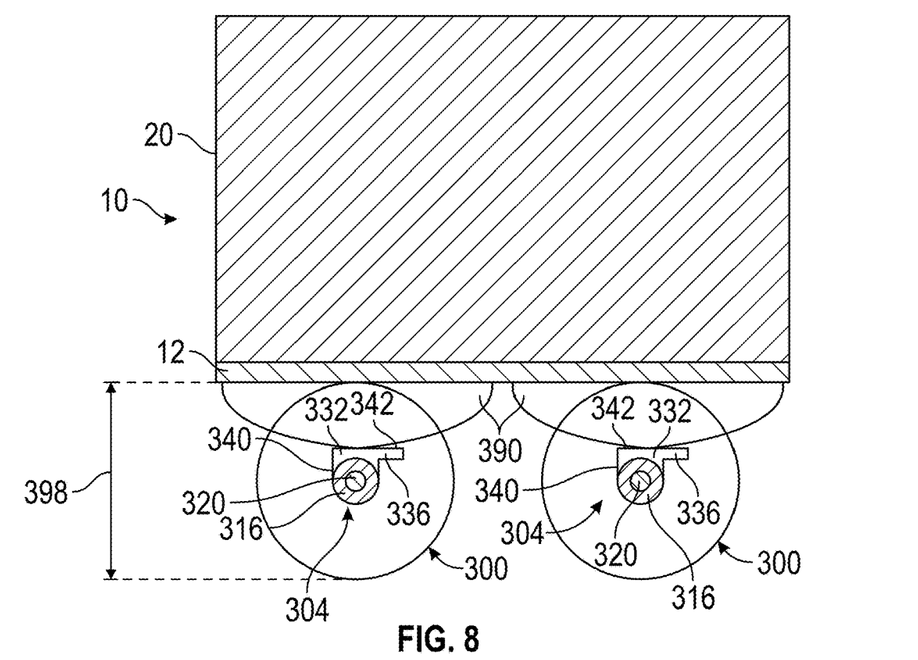
FIG. 8 is a side view of the axle assembly of FIG. 3 in the raised configuration and coupled to the vehicle of FIG. 1, according to an exemplary embodiment.

As shown in FIGS. 3-8, the first shaft assembly 304 and the second shaft assembly 308 are interchangeable or swappable between the left and right sides of the vehicle 10. By way of example, the first shaft assembly 304 can be coupled to either the left side or the right side of the differential 312 and the second shaft assembly 308 can be coupled to either the left side or the right side of the differential 312 such that the first shaft assembly 304 and the second shaft assembly 308 are coupled to opposite sides of the differential 312. Interchanging or swapping the first shaft assembly 304 and the second shaft assembly 308 with each other facilitates varying a height of the vehicle 10 (e.g., a ride height, a ground clearance, etc.). As shown in FIGS. 3 and 7, the first shaft assembly 304 and the second shaft assembly 308 are coupled to the differential 312 in a first configuration, shown as lowered configuration 374. As shown in FIGS. 6 and 8, the first shaft assembly 304 and the second shaft assembly 308 are coupled to the differential 312 in a second configuration, shown as raised configuration 378.

In the lowered configuration 374 shown in FIGS. 3 and 7, the first shaft assembly 304 is coupled to a first side 382 of the differential 312 (e.g., a left side of the differential 312 as viewed from FIG. 3) and oriented such that the first suspension support 324 extends downward from the tube 316. In the lowered configuration 374 shown in FIGS. 3 and 7, the second shaft assembly 308 is coupled to a second side 386 of the differential 312 (e.g., a right side of the differential 312 as viewed from FIG. 3) and oriented such that the second suspension support 328 extends downward from the tube 316. In the lowered configuration 374, the first suspension support 324 and the second suspension support 328 extend in a substantially horizontal plane parallel to and vertically below a plane in which the axis A extends such that (i) the first mounting plate 332 and the first extension 336 are substantially coplanar with the second mounting plate 352 and the second extension 356 and (ii) the first surface 342 is substantially coplanar with the second surface 362. As shown in FIGS. 3 and 7, in the lowered configuration 374, the first suspension support 324 and the second suspension support 328 are oriented (e.g., about the axis A) such that the first surface 342 and the second surface 362 face a downward direction (e.g., in a direction towards a ground surface on which the vehicle 10 is traveling).

In the raised configuration 378 shown in FIGS. 6 and 8, the first shaft assembly 304 is coupled to the second side 386 of the differential 312 (e.g., the right side of the differential 312 as viewed from FIG. 6) and oriented such that the first suspension support 324 extends upward from the tube 316. In the raised configuration 378 shown in FIGS. 6 and 8, the second shaft assembly 308 is coupled to the first side 382 of the differential 312 (e.g., the left side of the differential 312 as viewed from FIG. 6) and oriented such that the second suspension support 328 extends upward from the tube 316. In the raised configuration 378, the first suspension support 324 and the second suspension support 328 extend in a substantially horizontal plane parallel to and vertically above a plane in which the axis A extends such that (i) the first mounting plate 332 and the first extension 336 are substantially coplanar with the second mounting plate 352 and the second extension 356 and (ii) the first surface 342 is substantially coplanar with the second surface 362. As shown in FIGS. 6 and 8, in the raised configuration 378, the first suspension support 324 and the second suspension support 328 are oriented (e.g., about the axis A) such that the first surface 342 and the second surface 362 face an upward direction (e.g., in a direction away from a ground surface on which the vehicle 10 is traveling).

As shown in FIGS. 4 and 5, to transition the axle assembly 300 between the lowered configuration 374 and the raised configuration 378, the first shaft assembly 304 and the second shaft assembly 308 are swapped and are positioned to appropriately orient the first suspension support 324 and the second suspension support 328. More specifically, as shown in FIG. 4, the second shaft assembly 308 is coupled to the second side 386 in the lowered configuration 374. Then, to transition the second shaft assembly 308 to the raised configuration 378, the second shaft assembly 308 is decoupled (e.g., by the coupler 368 and the fasteners 372) from the differential 312 at the second side 386, moved to the first side 382 (as indicated by the arrow), and coupled (e.g., using the coupler 368 and the fasteners 372) to the first side 382 of the differential 312 (e.g., after decoupling the first shaft assembly 304 from the differential 312). Prior to coupling the second shaft assembly 308 to the first side 382 of the differential 312, the second shaft assembly 308 is oriented such that the second surface 362 faces the upward direction.

As shown in FIG. 5, the first shaft assembly 304 is coupled to the first side 382 in the lowered configuration 374. Then, to transition the first shaft assembly 304 to the raised configuration 378, the first shaft assembly 304 is decoupled (e.g., by the coupler 368 and the fasteners 372) from the first side 382 of the differential 312, moved to the second side 386 (as indicated by the arrow), and coupled (e.g., using the coupler 368 and the fasteners 372) to the second side 386 of the differential 312 (e.g., after decoupling the second shaft assembly 308 from the differential 312). Prior to coupling the first shaft assembly 304 to the second side 386 of the differential 312, the first shaft assembly 304 is oriented such that the first surface 342 faces the upward direction.

As shown in FIGS. 7 and 8, the first suspension support 324 and the second suspension support 328 are configured to facilitate coupling the axle assembly 300 to one or more components of the suspension system 60 and, thereby, to the frame 12 of the vehicle 10. Suspension components (e.g., shocks, dampers, springs, etc.) of the suspension system 60, shown as leaf springs 390, are configured to couple (i) the first shaft assembly 304 with the frame 12 and (ii) the second shaft assembly 308 with the frame 12. In some embodiments, the leaf springs 390 include several layers (e.g., leaves) stacked and clamped together and having varying lengths. In other embodiments, the leaf springs 390 are formed as a single unitary body. As shown in FIGS. 7 and 8, the leaf springs 390 define or have a shape that is generally parabolic or otherwise curved. In some embodiments, the leaf springs 390 define or have another suitable shape (e.g., semi-elliptical, quarter elliptical, three-quarter elliptical, full elliptical, etc.). In some embodiments, one or more fasteners are configured to extend through (i) the leaf springs 390 and (ii) the apertures 344 and the apertures 364 to couple the leaf springs 390 with the first suspension support 324 and the second suspension support 328, respectively. As shown in FIGS. 7 and 8, the leaf springs 390 are oriented concave up, resembling a U-shape, when coupled to the axle assembly 300. The shape or curvature of the leaf springs 390 may vary based on the load applied to the leaf springs 390.

As shown in FIG. 7, when the axle assembly 300 is configured in the lowered configuration 374, at least a portion of the leaf springs 390 is positioned vertically below the axle assembly 300. In the lowered configuration 374, (i) the first suspension support 324 and the second suspension support 328 are positioned underneath the tubes 316 and (ii) the first surface 342 and the second surface 362 are positioned along an upper surface of the leaf springs 390 and fastened thereto.

As shown in FIG. 8, when the axle assembly 300 is configured in the raised configuration 378, the leaf springs 390 are positioned vertically above the axle assembly 300 (e.g., the entirety or at least a portion of the leaf springs 390 is positioned vertically above the axle assembly 300). In the raised configuration 378, (i) the first suspension support 324 and the second suspension support 328 are positioned above the tubes 316 and (ii) the first surface 342 and the second surface 362 are positioned along a lower surface of the leaf springs 390 and fastened thereto.

As shown in FIG. 7, when the axle assemblies 300 are arranged in the lowered configuration 374, the axle assemblies 300 and the leaf springs 390 are configured to space the frame 12 a first distance 394 from the ground surface. As shown in FIG. 8, when the axle assemblies 300 are arranged in the raised configuration 378, the axle assemblies 300 and the leaf springs 390 are configured to space the frame 12 a second distance 398 from the ground surface where the second distance 398 is greater than the first distance 394 (e.g., by one, two, three, four, five, six, etc. inches). As shown in FIGS. 7 and 8, the first distance 394 and the second distance 398 are defined as a distance between a ground surface with which the tractive elements are engaged and a lowermost surface of the frame 12.

In some embodiments, transitioning the axle assemblies 300 from the lowered configuration 374 to the raised configuration 378 facilitates moving, lifting, or otherwise raising the leaf springs 390 relative to the axles 320 by twice the distance (e.g., a vertical distance, a minimum distance, etc.) from the axis A to an outer face (e.g., the first surface 342 and the second surface 362) of the first suspension support 324 and the second suspension support 328, respectively. In other words, transitioning the axle assemblies 300 from the lowered configuration 374 to the raised configuration 378 facilitates raising the ride height or clearance of the vehicle 10 by twice the distance from the axis A to an outer face (e.g., the first surface 342 and the second surface 362) of the first suspension support 324 and the second suspension support 328, respectively. Therefore, the second distance 398 is greater than the first distance 394 by twice the distance from the axis A to an outer face (e.g., the first surface 342 and the second surface 362) of the first suspension support 324 and the second suspension support 328, respectively. Similarly, transitioning the axle assembly 300 from the raised configuration 378 to the lowered configuration 374 facilitates lowering the ride height or clearance of the vehicle 10 by twice the distance from the axis A to an outer face (e.g., the first surface 342 and the second surface 362) of the first suspension support 324 and the second suspension support 328, respectively.

As shown in FIGS. 7 and 8, both the front axle assembly 300 and the rear axle assembly 300 are transitioned between the lowered configuration 374 and the raised configuration 378 to facilitate varying the ride height or clearance of the vehicle 10. In some embodiments, the front axle assembly 300 and the rear axle assembly 300 are differently configured from each other to vary a rake of the vehicle 10 (e.g., an angle of the frame 12 and the vehicle 10 relative to the ground surface). By way of example, the front axle assembly 300 may be configured in the lowered configuration 374 while the rear axle assembly 300 is configured in the raised configuration 378 such that a front end of the vehicle 10 is vertically lower than a rear end of the vehicle 10 (e.g., positive rake). By way of another example, the front axle assembly 300 may be configured in the raised configuration 378 while the rear axle assembly 300 is configured in the lowered configuration 374 such that a front end of the vehicle 10 is vertically higher than a rear end of the vehicle 10 (e.g., negative rake). In some embodiments, the first suspension support 324 and the second suspension support 328 are the same for the front axle assembly 300 and the rear axle assembly 300. In some embodiments, the first suspension support 324 and the second suspension support 328 are different such that the height of the front end of the vehicle 10 differs from the height of the rear end of the vehicle 10 when in the raised configuration (e.g., to provide a raked, raised configuration).

The present disclosure provides various advantages over traditional systems to selectively raise and lower the height of a vehicle. Traditional systems require additional bracketry (e.g., beyond the components used when the vehicle is at a first, lower height) that needs to be installed with the vehicle to relocate a position of a leaf spring such that the leaf spring is positioned vertically above the axle assembly and the vehicle is at a second, raised height. Further, traditional systems require different axles or tubes (e.g., different than the axles or tubes used when the vehicle is at the first, lower height) to transition the vehicle to the second, raised height. However, the axle assembly 300 of the present disclosure includes the first shaft assembly 304 and the second shaft assembly 308 that are interchangeable with each other to vary the height of the vehicle 10 without the need for additional bracketry or different axles or tubes.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the body 20, the operator controls 40, the driveline 50, the suspension system 60, the braking system 70, the sensors 90, the vehicle control system 100, etc.) and the axle assembly 300 as shown in the various exemplary embodiments is illustrative only. Additionally, any element disclosed in one embodiment may be incorporated or utilized with any other embodiment disclosed herein.

The invention claimed is:
1. A golf vehicle comprising:
a chassis having a front end and a rear end;
a suspension system coupled to the chassis;
a first plurality of tractive assemblies;
a second plurality of tractive assemblies;
a first axle assembly coupled to the suspension system and the first plurality of tractive assemblies; and
a second axle assembly coupled to the suspension system and the second plurality of tractive assemblies, the second axle assembly including a first shaft assembly and a second shaft assembly;
wherein the first shaft assembly and the second shaft assembly are interchangeable to transition the second axle assembly between (i) a first configuration that provides a first ride height for the front end or the rear end of the chassis and (ii) a second configuration that provides a second ride height for the front end or the rear end of the chassis that is greater than the first ride height.

2. The golf vehicle of claim 1, wherein the second axle assembly includes a differential positioned between the first shaft assembly and the second shaft assembly.

3. The golf vehicle of claim 2, wherein the first shaft assembly and the second shaft assembly are removably coupled to the differential to facilitate interchanging the first shaft assembly and the second shaft assembly.

4. The golf vehicle of claim 1, wherein each of the first shaft assembly and the second shaft assembly include a tube and an axle at least partially received and rotatable within the tube.

5. The golf vehicle of claim 4, wherein the first shaft assembly includes a first suspension support coupled to an outer surface of the tube of the first shaft assembly, and wherein the second shaft assembly includes a second suspension support coupled to the outer surface of the tube of the second shaft assembly.

6. The golf vehicle of claim 5, wherein the first suspension support couples the first shaft assembly to the suspension system, and wherein the second suspension support couples the second shaft assembly to the suspension system.

7. The golf vehicle of claim 6, wherein:
in the first configuration, the first suspension support and the second suspension support extend downward; and
in the second configuration, the first suspension support and the second suspension support extend upward.

8. The golf vehicle of claim 7, wherein:
the second axle assembly includes a differential;
in the first configuration, the first shaft assembly is coupled to a first side of the differential and the second shaft assembly is coupled to an opposing second side of the differential; and
in the second configuration, the first shaft assembly is coupled to the opposing second side of the differential at the second side and the second shaft assembly is coupled to the first side of the differential.

9. The golf vehicle of claim 6, wherein the first shaft assembly and the second shaft assembly are coaxial about an axis of rotation.

10. The golf vehicle of claim 9, wherein the second ride height is greater than the first ride height by twice a minimum distance from (a) the axis of rotation to (b) an outer face of the first suspension support and the second suspension support.

11. The golf vehicle of claim 6, wherein each of the first suspension support and the second suspension support includes:
a mounting plate having an extension coplanar therewith, the mounting plate defining a plurality of apertures;
a plurality of tabs extending from the mounting, the plurality of tabs coupling the mounting plate and the extension to the outer surface of the tube; and
a plurality of fasteners received by the plurality of apertures to couple the mounting plate to a component of the suspension system.

12. The golf vehicle of claim 1, wherein the first shaft assembly is a mirror image of the second shaft assembly about a substantially vertical plane perpendicular to an axis of rotation defined by the second axle assembly.

13. The golf vehicle of claim 1, wherein the second axle assembly is coupled to the suspension system proximate the rear end of the chassis.

14. The golf vehicle of claim 1, wherein the second axle assembly is coupled to the suspension system proximate the front end of the chassis.

15. The golf vehicle of claim 1, wherein the suspension system includes leaf springs coupling the first shaft assembly and the second shaft assembly to the chassis.

16. The golf vehicle of claim 15, wherein, in the first configuration, at least a portion of the leaf springs is positioned below the first shaft assembly and the second shaft assembly, and wherein, in the second configuration, the leaf springs are positioned above the first shaft assembly and the second shaft assembly.

17. The golf vehicle of claim 1, wherein the first axle assembly include a single, solid shaft or a pair of half-shafts.

18. A vehicle comprising:
a chassis having a front end and a rear end;
a suspension system coupled to the chassis, the suspension system including a first leaf spring and a second leaf spring;
a first tractive element;
a second tractive element; and
an axle assembly coupled to the first leaf spring, the second leaf spring, the first tractive element, and the second tractive element, the axle assembly including:
a first shaft assembly including a first suspension support coupled to the first leaf spring;
a second shaft assembly including a second suspension support coupled to the second leaf spring; and
a differential having a first side and an opposing second side;
wherein the first shaft assembly and the second shaft assembly are selectively couplable to the first side and the opposing second side;
wherein the first shaft assembly and the second shaft assembly are coaxial about an axis of rotation of the axle assembly; and
wherein the first shaft assembly and the second shaft assembly are interchangeable between the first side and the second side of the differential to transition the axle assembly between (i) a first configuration that provides a first ride height for the front end or the rear end of the chassis and (ii) a second configuration that provides a second ride height for the front end or the rear end of the chassis that is greater than the first ride height.

19. The vehicle of claim 18, wherein, in the first configuration, at least a portion of the first leaf spring and the second leaf spring is positioned below the first shaft assembly and the second shaft assembly, and wherein, in the second configuration, the first leaf spring and the second leaf spring are positioned above the first shaft assembly and the second shaft assembly.

20. An axle assembly for a vehicle including (i) a chassis having a front end and a rear end, (ii) a differential, and (iii) a suspension system, the axle assembly comprising:
a first shaft assembly including a first suspension support configured to couple to the suspension system and the differential; and
a second shaft assembly including a second suspension support configured to couple to the suspension system and the differential;
wherein the first shaft assembly and the second shaft assembly are configured to selectively couple to the differential; and
wherein the first shaft assembly and the second shaft assembly are interchangeable between a first side of the differential and an opposing second side of the differential to transition the axle assembly between (i) a first configuration that provides a first ride height for the front end or the rear end of the chassis and (ii) a second configuration that provides a second ride height for the front end or the rear end of the chassis that is greater than the first ride height.

* * * * *